(12) United States Patent
Manolakos et al.

(10) Patent No.: US 12,538,251 B2
(45) Date of Patent: Jan. 27, 2026

(54) PHYSICAL LAYER CONSIDERATIONS FOR UE POSITIONING

(71) Applicant: QUALCOMM Incorporated, San Diego, CA (US)

(72) Inventors: Alexandros Manolakos, Escondido, CA (US); Fei Huang, San Diego, CA (US); Xipeng Zhu, San Diego, CA (US); Yi Huang, San Diego, CA (US); Hong Cheng, Basking Ridge, NJ (US); Duo Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 501 days.

(21) Appl. No.: 17/801,042

(22) PCT Filed: Dec. 11, 2020

(86) PCT No.: PCT/US2020/064425
§ 371 (c)(1),
(2) Date: Aug. 19, 2022

(87) PCT Pub. No.: WO2021/183197
PCT Pub. Date: Sep. 16, 2021

(65) Prior Publication Data
US 2023/0081093 A1   Mar. 16, 2023

(30) Foreign Application Priority Data

Mar. 10, 2020 (GR) .............................. 20200100132

(51) Int. Cl.
*G01S 5/02*     (2010.01)
*H04W 4/02*     (2018.01)
(Continued)

(52) U.S. Cl.
CPC ........... *H04W 64/00* (2013.01); *H04W 24/08* (2013.01); *H04W 72/21* (2023.01)

(58) Field of Classification Search
CPC ..... H04W 64/00; H04W 72/21; H04W 72/23; H04W 24/08; Y02D 30/70
(Continued)

(56) References Cited

U.S. PATENT DOCUMENTS 9,344,248 B2   5/2016   Krishnamurthy et al.
9,955,408 B2   4/2018   Novlan et al.
(Continued)

FOREIGN PATENT DOCUMENTS

CN   107258099 A   10/2017
EP   3621351 A1    3/2020
(Continued)

OTHER PUBLICATIONS

ProQuest search history (Year: 2025).*
(Continued)

*Primary Examiner* — Moustapha Diaby
(74) *Attorney, Agent, or Firm* — QUALCOMM Incorporated

(57) ABSTRACT

A user equipment (UE) includes: a transceiver configured to send and receive communications signals wirelessly to and from a network entity; a memory; and a processor, communicatively coupled to the transceiver and the memory, configured to: send, via the transceiver to the network entity over a physical layer uplink channel, a positioning assistance request for the network entity to provide positioning assistance information indicating one or more parameters for signal exchange of one or more positioning reference signals between the UE and another device; receive the positioning assistance information from the network entity via the transceiver over a physical layer downlink channel; and
(Continued)

perform one or more UE-device positioning functions in accordance with the positioning assistance information.

30 Claims, 10 Drawing Sheets

(51) Int. Cl.
*H04W 24/08* (2009.01)
*H04W 64/00* (2009.01)
*H04W 72/21* (2023.01)

(58) Field of Classification Search
USPC .................................................. 455/456.1
See application file for complete search history.

(56) References Cited

U.S. PATENT DOCUMENTS

| | | | |
|---|---|---|---|
| 10,555,128 B2 | 2/2020 | Yu et al. | |
| 2013/0223394 A1* | 8/2013 | Nishio | H04L 1/0072 370/329 |
| 2015/0071189 A1* | 3/2015 | Park | H04W 56/00 370/329 |
| 2016/0127955 A1* | 5/2016 | Damnjanovic | H04W 36/00837 370/331 |
| 2018/0231648 A1 | 8/2018 | Zhang | |
| 2019/0380056 A1 | 12/2019 | Lee et al. | |
| 2020/0304252 A1* | 9/2020 | Shim | H04L 5/0053 |
| 2020/0344572 A1* | 10/2020 | Wakabayashi | H04W 64/00 |
| 2022/0236404 A1* | 7/2022 | Gunnarsson | G01S 13/765 |

FOREIGN PATENT DOCUMENTS

| | | | |
|---|---|---|---|
| JP | 2016506135 A | 2/2016 | |
| JP | 2017517966 A | 6/2017 | |
| JP | 2018528644 A | 9/2018 | |
| JP | 2019528019 A | 10/2019 | |

OTHER PUBLICATIONS

IP.com search History (Year: 2025).*
Intel Corporation: "Analysis of Techniques for NR UL Positioning", 3GPP Draft, R1-1900513, 3GPP TSG RAN WG1 Ad-Hoc Meeting 1901, Intel—NR_UL_POS, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 12, 2019, XP051576119, pp. 1-15.
Qualcomm Incorporated: "Combined Downlink and Uplink NR Positioning Procedures", 3GPP TSG-RAN WG2 Meeting #104, R2-1817899, Spokane, USA, Nov. 12-16, 2018, pp. 1-18, Nov. 2, 2018.
Taiwan Search Report—TW109144066—TIPO—Apr. 11, 2024.
Qualcomm Incorporated: "On Demand Transmission of PRS for NR," 3GPP Draft, 3GPP TSG-RAN WG2 Meeting #104, R2-1817902_ (On Demand PRS), 3rd Generation Partnership Project (3GPP), Mobile Competence Centre, 650, Route Des Lucioles, F-06921, Sophia-Antipolis Cedex, France, vol. RAN WG2. No. Spokane. USA, Nov. 12, 2018-Nov. 16, 2018, Nov. 12, 2018 (Nov. 12, 2018), XP051557415, 27 pages, Retrieved from the Internet: URL: http://www.3gpp.org/ftp/Meetings%5F3GPP%5FSYNC/RAN2/Docs/R2%2D1817902%2Ezip [retrieved on Nov. 12, 2018].
International Search Report and Written Opinion—PCT/US2020/064425—ISA/EPO—Apr. 6, 2021.
Qualcomm Incorporated: "On Demand Transmission of PRS for NR," 3GPP Draft, 3GPP TSG-RAN WG2 Meeting #104, R2-1817902_ (On Demand Prs), 3RD Generation Partnership Project (3GPP), Mobile Competence Centre, 650, Route Des Lucioles, F-06921, Sophia-Antipolis Cedex, France, vol. RAN WG2. No, Spokane. USA, Nov. 12, 2018-Nov. 16, 2018, Nov. 12, 2018 (Nov. 12, 2018), XP051557415, 27 pages, Retrieved from the Internet: URL: http://www.3gpp.org/ftp/Meetings%5F3GPP%5FSYNC/RAN2/Docs/R2%2D1817902%2Ezip [retrieved on Nov. 12, 2018], the whole document, Sections 9.2.x.3 and 9.2.x.6; figures9.2.x.3-1,9.2.x.6-1, 9.2.x.2.1,9.2.x.3.1.

* cited by examiner

PHYSICAL LAYER CONSIDERATIONS FOR UE POSITIONING

CROSS-REFERENCE TO RELATED APPLICATIONS

This application is the National Stage of International Application No. PCT/US2020/064425, filed Dec. 11, 2020, entitled "PHYSICAL LAYER CONSIDERATIONS FOR UE POSITIONING," which claims the benefit of Greek patent application Ser. No. 20200100132, filed Mar. 10, 2020, entitled "PHYSICAL LAYER CONSIDERATIONS FOR UE POSITIONING," both of which are assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

An example user equipment (UE) includes: a transceiver configured to send and receive communications signals wirelessly to and from a network entity; a memory, and a processor, communicatively coupled to the transceiver and the memory, configured to: send, via the transceiver to the network entity over a physical layer uplink channel, a positioning assistance request for the network entity to provide positioning assistance information indicating one or more parameters for signal exchange of one or more positioning reference signals between the UE and another device; receive the positioning assistance information from the network entity via the transceiver over a physical layer downlink channel; and perform one or more UE-device positioning functions in accordance with the positioning assistance information.

Implementations of such a UE may include one or more of the following features. The positioning assistance request consists of a single bit. The positioning assistance request has a format of a scheduling request for requesting an uplink grant for the UE to transmit over a physical uplink shared channel. The processor is further configured to send, via the transceiver to the network entity over the physical layer uplink channel, one or more indications of positioning technique characteristics. The one or more indications of positioning technique characteristics includes: (i) one or more reference signal types to be transmitted by the UE; or (ii) a positioning technique that the UE is configured to use to determine position; or (iii) a signal technology that the UE is configured to use to determine position; or (iv) a measurement gap request; or (v) a bandwidth, time window, and resource request; or (vi) a band or carrier to be used by the UE for position determination; or (vii) a location, or velocity, or trajectory, or combination of two or more thereof, of a neighbor UE; or (viii) a combination of two or more of (i)-(vii).

Also or alternatively, implementations of such a UE may include one or more of the following features. The processor is configured to send the positioning assistance request over a semi-persistent physical uplink shared channel. The processor is configured to send the positioning assistance request over a physical uplink control channel. The processor is further configured to send, via the transceiver to the network entity over a physical uplink shared channel, one or more indications of positioning technique characteristics. The physical uplink shared channel is a semi-persistent physical uplink shared channel.

Also or alternatively, implementations of such a UE may include one or more of the following features. The processor is configured to determine which physical resources of the UE to use for performing the one or more UE-device positioning functions based on the positioning assistance information. The processor is configured to determine, based on the positioning assistance information, at least one of a type of a positioning signal to transmit for UE-device positioning, or a transmit power level for the positioning signal, or a positioning signal transmit duration, or a first measurement gap in which to transmit the positioning signal, or a second measurement gap for receiving an inbound positioning signal from another UE. The processor is configured to descramble positioning signals using a UE identity in the positioning assistance information.

Another example UE includes: means for sending, to a network entity over a physical layer uplink channel, a positioning assistance request for the network entity to provide positioning assistance information indicating one or more parameters for signal exchange of one or more positioning reference signals between the UE and another device; means for receiving the positioning assistance information from the network entity over a physical layer downlink channel; and means for performing one or more UE-device positioning functions in accordance with the positioning assistance information.

Implementations of such a UE may include one or more of the following features. The positioning assistance request consists of a single bit. The positioning assistance request has a format of a scheduling request for requesting an uplink grant for the UE to transmit over a physical uplink shared channel. The means for sending the positioning assistance request are for sending one or more indications of positioning technique characteristics to the network entity over the physical layer uplink channel in association with the positioning assistance request. The one or more indications of positioning technique characteristics includes: (i) one or more reference signal types to be transmitted by the UE; or (ii) a positioning technique that the UE is configured to use to determine position; or (iii) a signal technology that the UE is configured to use to determine position; or (iv) a measurement gap request; or (v) a bandwidth, time window, and resource request; or (vi) a band or carrier to be used by the UE for position determination; or (vii) a location, or velocity, or trajectory, or combination of two or more thereof, of a neighbor UE; or (viii) a combination of two or more of (i)-(vii).

Also or alternatively, implementations of such a UE may include one or more of the following features. The means for sending the positioning assistance request are for sending the positioning assistance request over a semi-persistent physical uplink shared channel. The means for sending the positioning assistance request are for sending the positioning assistance request over a physical uplink control channel. The UE includes means for sending, to the network entity over a physical uplink shared channel, one or more indications of positioning technique characteristics associated with the positioning assistance request. The physical uplink shared channel is a semi-persistent physical uplink shared channel.

Also or alternatively, implementations of such a UE may include one or more of the following features. The UE includes determining means for determining which physical resources of the UE to use for performing the one or more UE-device positioning functions based on the positioning assistance information. The determining means are for determining, based on the positioning assistance information, at least one of a type of a positioning signal to transmit for UE-device positioning, or a transmit power level for the positioning signal, or a positioning signal transmit duration, or a first measurement gap in which to transmit the positioning signal, or a second measurement gap for receiving an inbound positioning signal from another UE. The UE includes means for descrambling positioning signals using a UE identity in the positioning assistance information.

An example positioning method of a UE includes: sending, from the UE to a network entity over a physical layer uplink channel, a positioning assistance request for the network entity to provide positioning assistance information indicating one or more parameters for signal exchange of one or more positioning reference signals between the UE and another device; receiving the positioning assistance information from the network entity at the UE over a physical layer downlink channel; and performing one or more UE-device positioning functions at the UE in accordance with the positioning assistance information.

Implementations of such a method may include one or more of the following features. The positioning assistance request consists of a single bit. The positioning assistance request has a format of a scheduling request for requesting an uplink grant for the UE to transmit over a physical uplink shared channel. The method includes sending one or more indications of positioning technique characteristics to the network entity over the physical layer uplink channel in association with the positioning assistance request. The one or more indications of positioning technique characteristics includes: (i) one or more reference signal types to be transmitted by the UE; or (ii) a positioning technique that the UE is configured to use to determine position; or (iii) a signal technology that the UE is configured to use to determine position; or (iv) a measurement gap request; or (v) a bandwidth, time window, and resource request; or (vi) a band or carrier to be used by the UE for position determination; or (vii) a location, or velocity, or trajectory, or combination of two or more thereof, of a neighbor UE; or (viii) a combination of two or more of (i)-(vii).

Also or alternatively, implementations of such a method may include one or more of the following features. Sending the positioning assistance request includes sending the positioning assistance request over a semi-persistent physical uplink shared channel. Sending the positioning assistance request includes sending the positioning assistance request over a physical uplink control channel. The method includes sending, from the UE to the network entity over a physical uplink shared channel, one or more indications of positioning technique characteristics associated with the positioning assistance request. The physical uplink shared channel is a semi-persistent physical uplink shared channel.

Also or alternatively, implementations of such a method may include one or more of the following features. The method includes determining which physical resources of the UE to use for performing the one or more UE-device positioning functions based on the positioning assistance information. Determining which physical resources of the UE to use for performing the one or more UE-device positioning functions includes determining, based on the positioning assistance information, at least one of a type of a positioning signal to transmit for UE-device positioning, or a transmit power level for the positioning signal, or a positioning signal transmit duration, or a first measurement gap in which to transmit the positioning signal, or a second measurement gap for receiving an inbound positioning signal from another UE. The method includes descrambling positioning signals using a UE identity in the positioning assistance information.

An example non-transitory, processor-readable storage medium includes processor-readable instructions configured to cause a processor of a UE to: send, to a network entity over a physical layer uplink channel, a positioning assistance request for the network entity to provide positioning assistance information indicating one or more parameters for signal exchange of one or more positioning reference signals between the UE and another device; receive the positioning assistance information from the network entity over a physical layer downlink channel; and perform one or more UE-device positioning functions in accordance with the positioning assistance information.

Implementations of such a storage medium may include one or more of the following features. The positioning assistance request consists of a single bit. The positioning assistance request has a format of a scheduling request for requesting an uplink grant for the UE to transmit over a physical uplink shared channel. The instructions are configured to cause the processor to send, to the network entity over the physical layer uplink channel, one or more indications of positioning technique characteristics. The one or more indications of positioning technique characteristics includes: (i) one or more reference signal types to be transmitted by the UE; or (ii) a positioning technique that the UE is configured to use to determine position; or (iii) a signal technology that the UE is configured to use to determine position; or (iv) a measurement gap request; or (v) a bandwidth, time window, and resource request; or (vi) a band or carrier to be used by the UE for position determination; or (vii) a location, or velocity, or trajectory, or combination of two or more thereof, of a neighbor UE; or (viii) a combination of two or more of (i)-(vii).

Also or alternatively, implementations of such a storage medium may include one or more of the following features. The instructions are configured to cause the processor to send the positioning assistance request over a semi-persistent physical uplink shared channel. The instructions are configured to cause the processor to send the positioning assistance request over a physical uplink control channel. The instructions are further configured to cause the processor to send, to the network entity over a physical uplink shared channel, one or more indications of positioning technique characteristics. The physical uplink shared channel is a semi-persistent physical uplink shared channel.

Also or alternatively, implementations of such a storage medium may include one or more of the following features. The instructions are configured to cause the processor to determine which physical resources of the UE to use for performing the one or more UE-device positioning functions. The instructions are configured to cause the processor to determine, based on the positioning assistance information, at least of a type of a positioning signal to transmit for UE-device positioning, or a transmit power level for the positioning signal, or a positioning signal transmit duration, or a first measurement gap in which to transmit the positioning signal, or a second measurement gap for receiving an inbound positioning signal from another UE. The instructions are configured to cause the processor to descramble positioning signals using a UE identity in the positioning assistance information.

An example network entity includes: a transceiver configured to send and receive communications signals wirelessly to and from a UE; a memory; and a processor, communicatively coupled to the transceiver and the memory, configured to: receive, via the transceiver from the UE over a physical layer uplink channel, a positioning assistance request for the network entity to provide positioning assistance information indicating one or more parameters for signal exchange of one or more positioning reference signals between the UE and another device; determine the positioning assistance information; and send the positioning assistance information to the UE via the transceiver over a physical layer downlink channel in a physical layer message.

Implementations of such a network entity may include one or more of the following features. The positioning assistance information includes a first indication of physical resources that the UE is allowed to use for transmitting a reference signal for UE-device positioning. The positioning assistance information includes at least one of a type of a positioning signal that the UE is authorized to transmit for UE-device positioning, or a transmit power level that the UE is authorized to use to transmit a signal for UE-device positioning, or a positioning signal transmit duration that the UE is authorized to use for UE-device positioning, or a measurement gap in which the UE is authorized to transmit the positioning signal.

Also or alternatively, implementations of such a network entity may include one or more of the following features. The positioning assistance information includes a first indication of physical resources that the UE is allowed to use for receiving a reference signal for UE-device positioning. The positioning assistance information includes a measurement gap to be used by the UE for receiving an inbound positioning signal from another UE.

Also or alternatively, implementations of such a network entity may include one or more of the following features. The UE is a first UE and the positioning assistance information includes: (i) a UE identity of a second UE neighboring the first UE; or (ii) a location of the second UE; or (ii) a velocity of the second UE; or (iii) a trajectory of the second UE; or (iv) descrambling information for descrambling the positioning assistance information. The processor is configured to send the physical layer message as a unicast message over a physical downlink shared channel. The processor is configured to send the physical layer message as a group-common message over a physical downlink control channel. The processor is configured to respond to receiving a plurality of positioning assistance requests from a plurality of requesting UEs to produce the physical layer message with a plurality of blocks each including grant information for granting a respective physical downlink shared channel to each of the plurality of requesting UEs. The processor is configured to determine the positioning assistance information within a bottom two layers of a 5G protocol stack.

Another example network entity includes: means for receiving, from a UE over a physical layer uplink channel, a positioning assistance request for the network entity to provide positioning assistance information indicating one or more parameters for signal exchange of one or more positioning reference signals between the UE and another device; means for determining the positioning assistance information; and means for sending the positioning assistance information to the UE over a physical layer downlink channel in a physical layer message.

Implementations of such a network entity may include one or more of the following features. The positioning assistance information includes a first indication of physical resources that the UE is allowed to use for transmitting a reference signal for UE-device positioning. The positioning assistance information includes at least one of a type of a positioning signal that the UE is authorized to transmit for UE-device positioning, or a transmit power level that the UE is authorized to use to transmit a signal for UE-device positioning, or a positioning signal transmit duration that the UE is authorized to use for UE-device positioning, or a measurement gap in which the UE is authorized to transmit the positioning signal.

Also or alternatively, implementations of such a network entity may include one or more of the following features. The positioning assistance information includes a first indication of physical resources that the UE is allowed to use for receiving a reference signal for UE-device positioning. The positioning assistance information includes a measurement gap to be used by the UE for receiving an inbound positioning signal from another UE.

Also or alternatively, implementations of such a network entity may include one or more of the following features. The UE is a first UE and the positioning assistance information includes: (i) a UE identity of a second UE neighboring the first UE; or (ii) a location of the second UE; or (ii) a velocity of the second UE; or (iii) a trajectory of the second UE; or (iv) descrambling information for descrambling the positioning assistance information. The means for sending the positioning assistance information are for sending the physical layer message as a unicast message over a physical downlink shared channel. The means for sending the positioning assistance information are for sending the physical layer message as a group-common message over a physical downlink control channel. The network entity includes means for responding to receiving a plurality of positioning assistance requests from a plurality of requesting UEs to produce the physical layer message with a plurality of blocks each including grant information for granting a respective physical downlink shared channel to each of the plurality of requesting UEs. The means for determining the positioning assistance information include means for determining the positioning assistance information within a bottom two layers of a 5G protocol stack.

An example method of providing positioning assistance information using a physical layer includes: receiving, at a network entity from a user equipment (UE) over a physical layer uplink channel, a positioning assistance request for the network entity to provide the positioning assistance information indicating one or more parameters for signal exchange of one or more positioning reference signals between the UE and another device; determining the positioning assistance information; and sending the positioning assistance information to the UE over a physical layer downlink channel in a physical layer message.

Implementations of such a method may include one or more of the following features. The positioning assistance information includes a first indication of physical resources that the UE is allowed to use for transmitting a reference signal for UE-device positioning. The positioning assistance information includes at least one of a type of a positioning signal that the UE is authorized to transmit for UE-device positioning, or a transmit power level that the UE is authorized to use to transmit a signal for UE-device positioning, or a positioning signal transmit duration that the UE is authorized to use for UE-device positioning, or a measurement gap in which the UE is authorized to transmit the positioning signal.

Also or alternatively, implementations of such a method may include one or more of the following features. The positioning assistance information includes a first indication of physical resources that the UE is allowed to use for receiving a reference signal for UE-device positioning. The positioning assistance information includes a measurement gap to be used by the UE for receiving an inbound positioning signal from another UE.

Also or alternatively, implementations of such a method may include one or more of the following features. The UE is a first UE and the positioning assistance information includes: (i) a UE identity of a second UE neighboring the first UE; or (ii) a location of the second UE; or (ii) a velocity of the second UE; or (iii) a trajectory of the second UE; or (iv) descrambling information for descrambling the positioning assistance information. Sending the positioning assistance information includes sending the physical layer message as a unicast message over a physical downlink shared channel. Sending the positioning assistance information includes sending the physical layer message as a group-common message over a physical downlink control channel. The method includes responding to receiving a plurality of positioning assistance requests from a plurality of requesting UEs by producing the physical layer message with a plurality of blocks each including grant information for granting a respective physical downlink shared channel to each of the plurality of requesting UEs. The positioning assistance information is determined within a bottom two layers of a 5G protocol stack.

An example non-transitory, processor-readable storage medium includes processor-readable instructions configured to cause a processor to: receive, at a network entity from a user equipment (UE) over a physical layer uplink channel, a positioning assistance request for the network entity to provide positioning assistance information indicating one or more parameters for signal exchange of one or more positioning reference signals between the UE and another device; determine the positioning assistance information; and send the positioning assistance information to the UE over a physical layer downlink channel in a physical layer message.

Implementations of such a storage medium may include one or more of the following features. The positioning assistance information includes a first indication of physical resources that the UE is allowed to use for transmitting a reference signal for UE-device positioning. The positioning assistance information includes at least one of a type of a positioning signal that the UE is authorized to transmit for UE-device positioning, or a transmit power level that the UE is authorized to use to transmit a signal for UE-device positioning, or a positioning signal transmit duration that the UE is authorized to use for UE-device positioning, or a measurement gap in which the UE is authorized to transmit the positioning signal.

Also or alternatively, implementations of such a storage medium may include one or more of the following features. The positioning assistance information includes a first indication of physical resources that the UE is allowed to use for receiving a reference signal for UE-device positioning. The positioning assistance information includes a measurement gap to be used by the UE for receiving an inbound positioning signal from another UE.

Also or alternatively, implementations of such a storage medium may include one or more of the following features. The UE is a first UE and the positioning assistance information includes: (i) a UE identity of a second UE neighboring the first UE; or (ii) a location of the second UE; or (ii) a velocity of the second UE; or (iii) a trajectory of the second UE; or (iv) descrambling information for descrambling the positioning assistance information. The instructions are configured to cause the processor to send the physical layer message as a unicast message over a physical downlink shared channel. The instructions are configured to cause the processor to send the physical layer message as a group-common message over a physical downlink control channel. The instructions are configured to cause the processor to respond to receiving a plurality of positioning assistance requests from a plurality of requesting UEs to produce the physical layer message with a plurality of blocks each including grant information for granting a respective physical downlink shared channel to each of the plurality of requesting UEs. The instructions configured to cause the processor to determine the positioning assistance information include instructions configured to cause the processor to determining the positioning assistance information within a bottom two layers of a 5G protocol stack.

DETAILED DESCRIPTION

Figure 1:
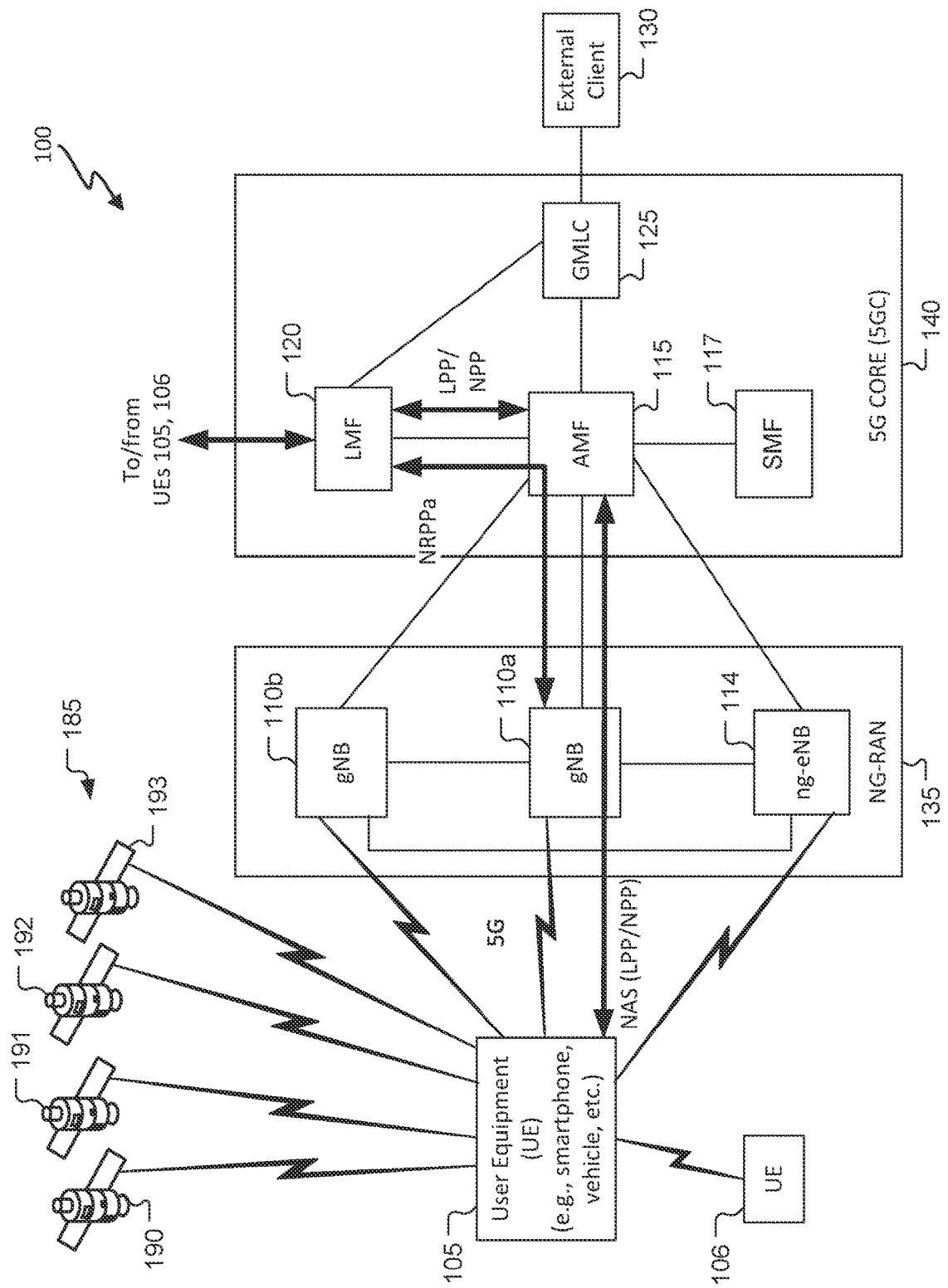
FIG. 1 is a simplified diagram of an example wireless communications system.

Techniques are discussed herein for physical layer considerations for base-station-assisted positioning. For example, techniques are discussed for using a physical layer to provide positioning assistance information from a base station to a user equipment and using the positioning assistance information to perform one or more positioning operations, e.g., for UE-device positioning such as UE-to-UE positioning. The base station may receive a request for positioning assistance information and determine the positioning assistance information within a physical layer and a data link layer of the base station (i.e., without using higher layers), and provide the positioning assistance information to the user equipment. The positioning assistance information may provide, for example, authorization and/or limitations on use of resources by the user equipment, and/or other information that the user equipment may use to determine what positioning function(s) to perform and/or how to perform the function(s). These are examples, and other examples may be implemented.

Items and/or techniques described herein may provide one or more of the following capabilities, as well as other capabilities not mentioned. Low latency of signal exchange for assisting a user equipment to perform positioning functions may be provided. Assistance data may be produced within a bottom two layers of a protocol stack and provided to a user equipment in a message occupying fewer bits than a message containing similar content produced using a higher layer of the protocol stack. Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110*a*, 110*b*. 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth™-low energy (BLE), Zigbee, etc. One or more of the BSs 110*a*, 110*b*, 114 may be configured to communicate with the UE 105 via multiple carriers. Each of the BSs 110*a*, 110*b*, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114. AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110*a*, 110*b*, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G. Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicleto-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the position of the UE 105.

Figure 2:
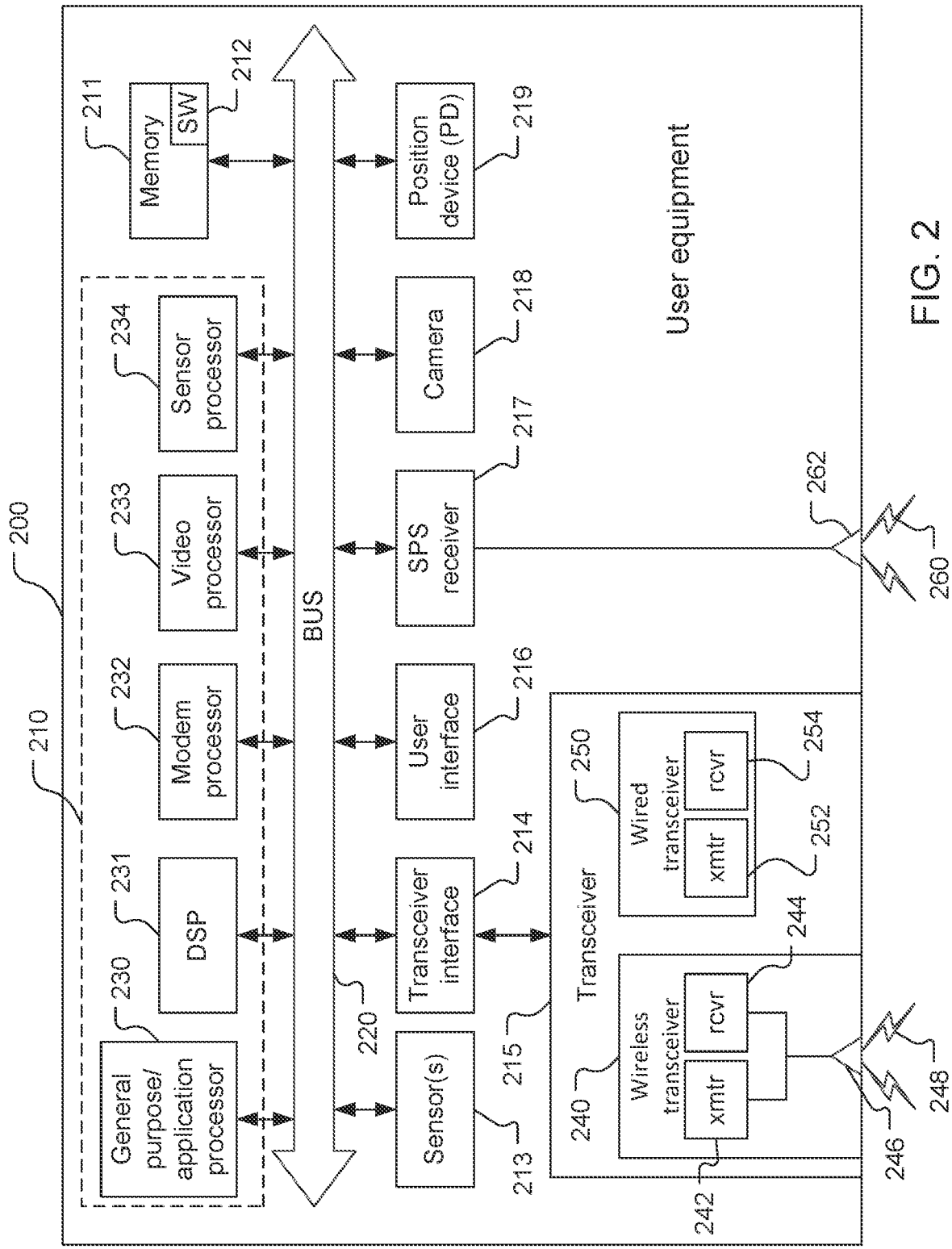
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., with the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Figure 3:
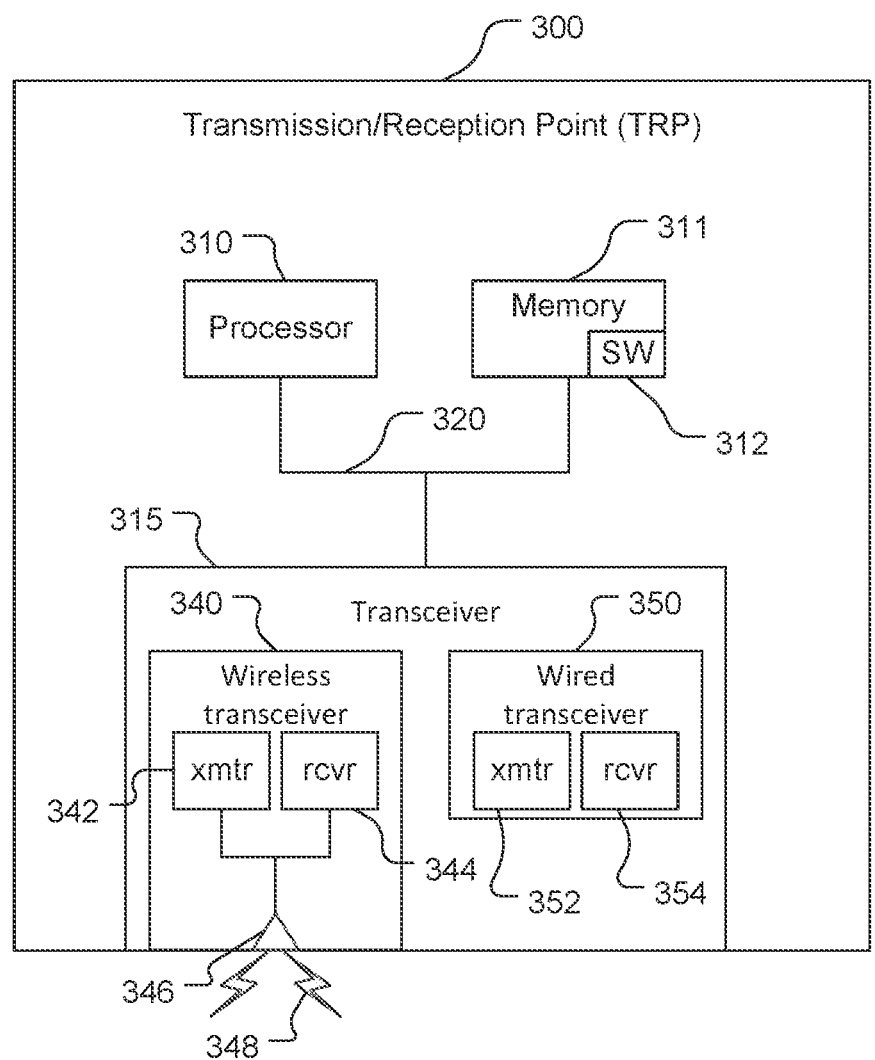
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication. e.g., with the network 140 to send communications to, and receive communications from, the LMF 120, for example. The wired transmitter 352 may include multiple transmitters that may be discrete components or combined/integrated components, and/or the wired receiver 354 may include multiple receivers that may be discrete components or combined/integrated components. The wired transceiver 350 may be configured. e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
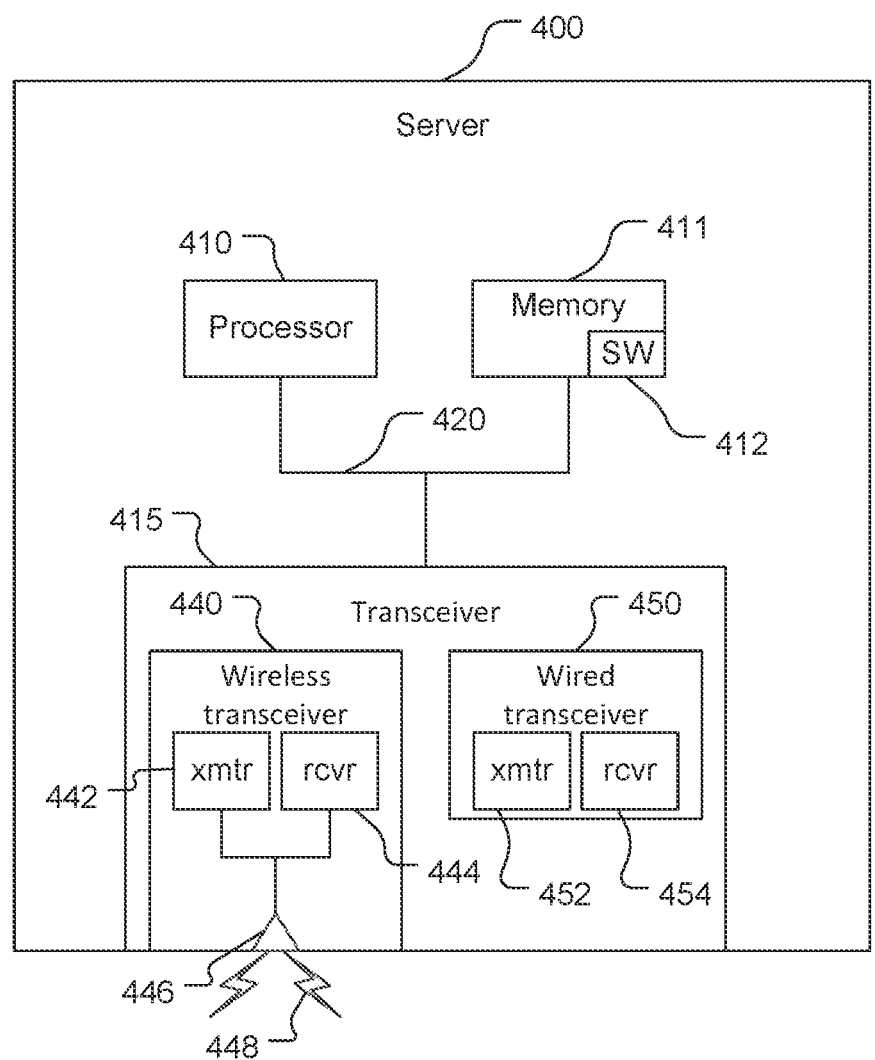
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., with the network 135 to send communications to, and receive communications from, the TRP 300, for example. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RT). PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every Nib resource element is a PRS resource element).

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods. UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

Base-Station Assisted UE-Device Positioning

Figure 5:
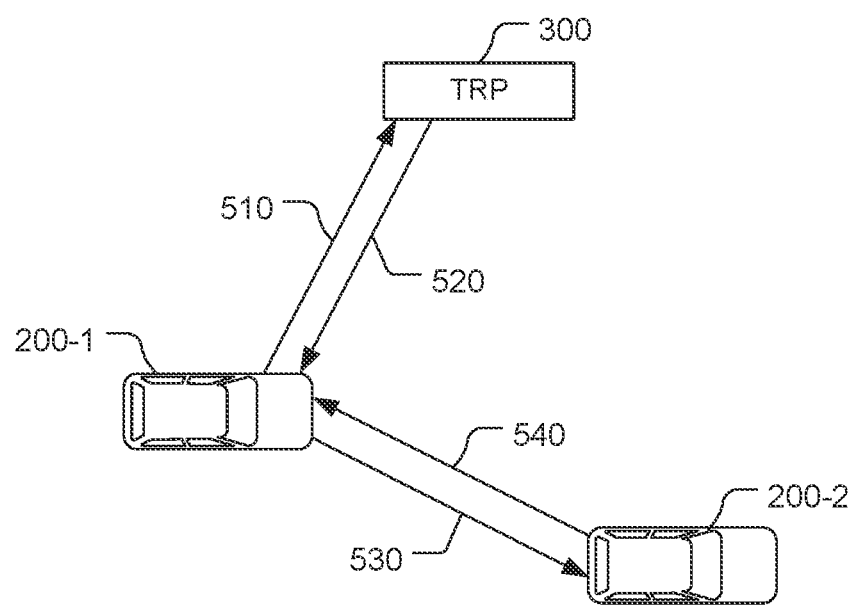
FIG. 5 is a simplified top view of a system for UE-device positioning, showing interaction between UEs and a base station.

Referring to FIG. 5, the TRP 300 and UEs 200-1, 200-2 may be configured for base-station-assisted UE-to-UE positioning where a base station, here the TRP 300, provides positioning assistance information to the UE 200-1 for use in UE-device interaction (UE-to-UE interaction with the UE 200-2 in the example of FIG. 5) to determine position information (e.g., relative position of the UE 200-2 to another device, here the UE 200-1). The UEs 200-1, 200-2 are implementations of the UE 200, but other UE implementations may be used, e.g., a UE 600 discussed herein. The positioning assistance information may be referred to as assistance information. The UE 200-1 may send a positioning search request 510 to the TRP 300 and the TRP 300 may respond by sending a positioning search response 520 with positioning assistance information for the UE 200-1. The UE 200-1 may use the positioning assistance information to send a ranging signal 530 to the UE 200-2 and a response ranging signal 540 may be returned to the UE 200-1 (e.g., reflected off the UE 200-2 or sent by the UE 200-2 to the UE 200-1). Typically, signaling between the UEs 200-1, 200-2 is reported using LPP (LTE Positioning Protocol) or RRC (Radio Resource Control) both of which involve the 5G protocol stack above Layer 2.

The UE 200-1 may also communicate with the TRP 300 to request an uplink grant to transmit data on a physical uplink shared channel (PUSCH). The UE 200-1 may send a Scheduling Request (SR) that is a special physical layer message for the UE 200-1 to ask a network entity, e.g., the TRP 300, to send an UL Grant so that the UE 200-1 can transmit data on the PUSCH (which may be referred to as transmitting PUSCH). For example, in response to the UE 200-1 having data to be transmitted, the UE 200-1 may send an SR message over a physical uplink control channel (PUCCH), using a PUCCH format, to ask the TRP 300 for a UL Grant. The TRP 300 is configured to reply to the SR message from the UE 200-1 with a UL Grant in one or more Downlink Control Information (DCI) messages in either a DCI 0_0 format or a DCI 0_1 format (that are used for scheduling PUSCH) over a physical downlink control channel (PDCCH). With the UL Grant provided by the TRP 300, the UE 200-1 transmits data to the TRP 300 over the PUSCH channel.

Figure 6:
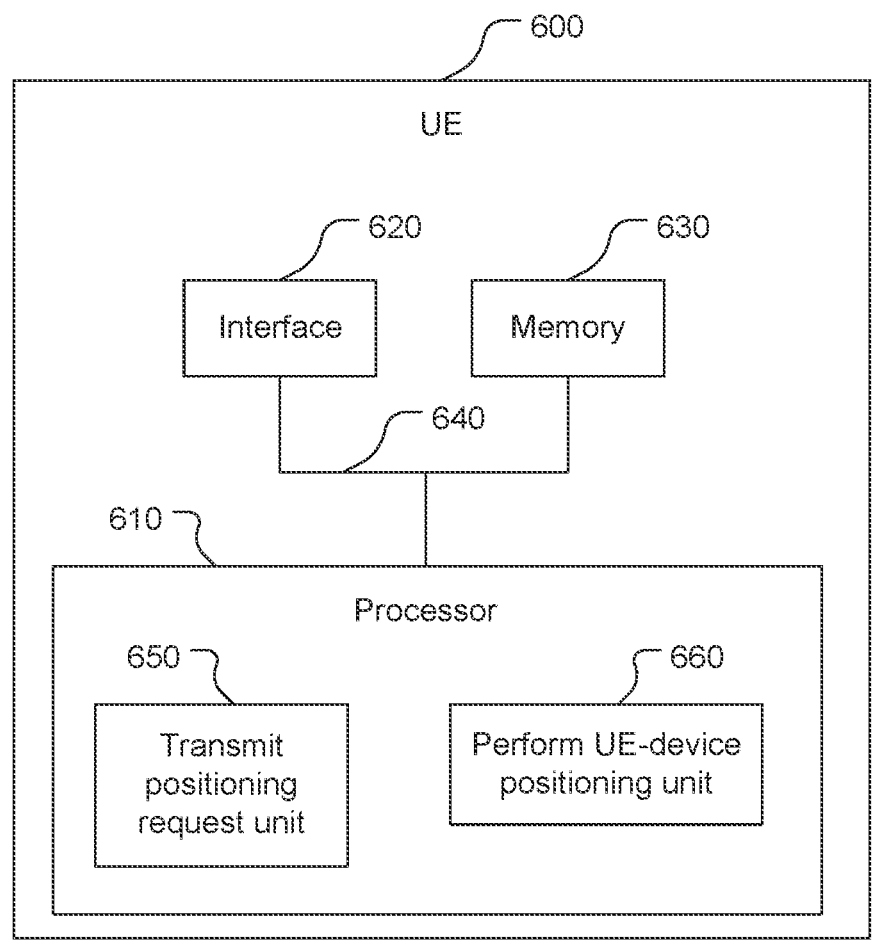
FIG. 6 is a block diagram of an example user equipment.

Referring to FIG. 6, with further reference to FIGS. 1-3, a UE 600 includes a processor 610, an interface 620, and a memory 630 communicatively coupled to each other by a bus 640. The UE 600 may include the components shown in FIG. 6, and may include one or more other components such as any of those shown in FIG. 2 such that the UE 200 may be an example of the UE 600. The interface 620 may be configured similarly to all or a portion of the transceiver 215 and the memory 630 may be configured similarly to the memory 211, e.g., including software with processor-readable instructions configured to cause the processor 610 to perform functions. The description may refer only to the processor 610 performing a function, but this includes other implementations such as where the processor 610 executes software (stored in the memory 630) and/or firmware. The description may refer to the UE 600 performing a function as shorthand for one or more appropriate components (e.g., the processor 610 and the memory 630) of the UE 600 performing the function. The processor 610 (possibly in conjunction with the memory 630 and, as appropriate, the interface 620) includes a transmit positioning request unit 650 and a perform UE-device positioning unit 660 configured to, respectively, transmit a positioning request (PR) using the physical layer, and to use positioning assistance information to perform one or more UE-device positioning functions. The units 650, 660 are discussed further below, and the description may refer to the processor 610 generally, or the UE 600 generally, as performing any of the functions of the units 650, 660.

Figure 7:
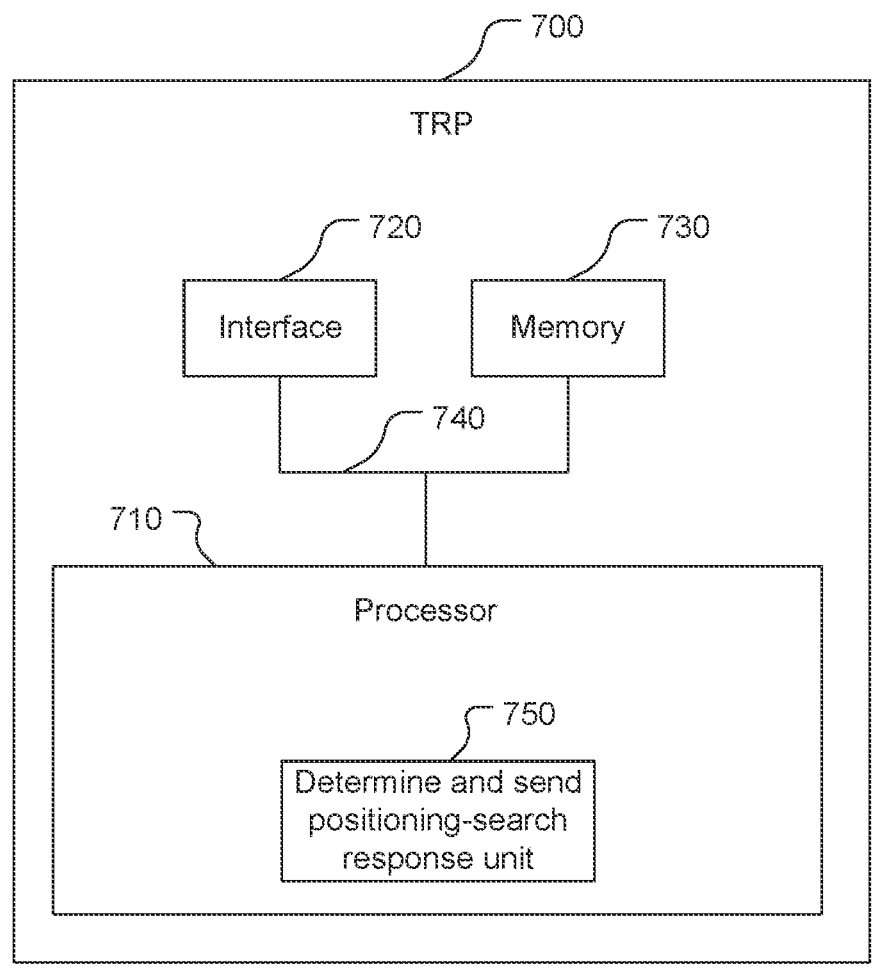
FIG. 7 is a block diagram of an example of the transmission/reception point shown in FIG. 3.

Referring also to FIG. 7, with further reference to FIGS. 1 and 4, a TRP 700, which is an example of the TRP 300 shown in FIG. 3, includes a processor 710, an interface 720, and a memory 730 communicatively coupled to each other by a bus 740. The TRP 700 may include the components shown in FIG. 7, and may include one or more other components such as any of those shown in FIG. 3. The interface 720 may be configured similarly to all or a portion of the transceiver 315, or at least the wireless transmitter 342 of the transceiver 315 and the memory 730 may be configured similarly to the memory 311, e.g., including software with processor-readable instructions configured to cause the processor 710 to perform functions. The description may refer only to the processor 710 performing a function, but this includes other implementations such as where the processor 710 executes software (stored in the memory 730) and/or firmware. The description may refer to the TRP 700 performing a function as shorthand for one or more appropriate components (e.g., the processor 710 and the memory 730) of the TRP 700 performing the function. The processor 710 (possibly in conjunction with the memory 730 and, as appropriate, the interface 720 and the antenna 346) includes a determine and send positioning-search response unit 750 configured to determine and send a positioning-search response (PSR), in response to receiving the positioning-search request, with the PSR including positioning assistance information for performing one or more UE-device positioning functions. These functions are discussed further below, and the description may refer to the processor 710 generally, or the TRP 700 generally, as performing any of these functions.

Figure 8:
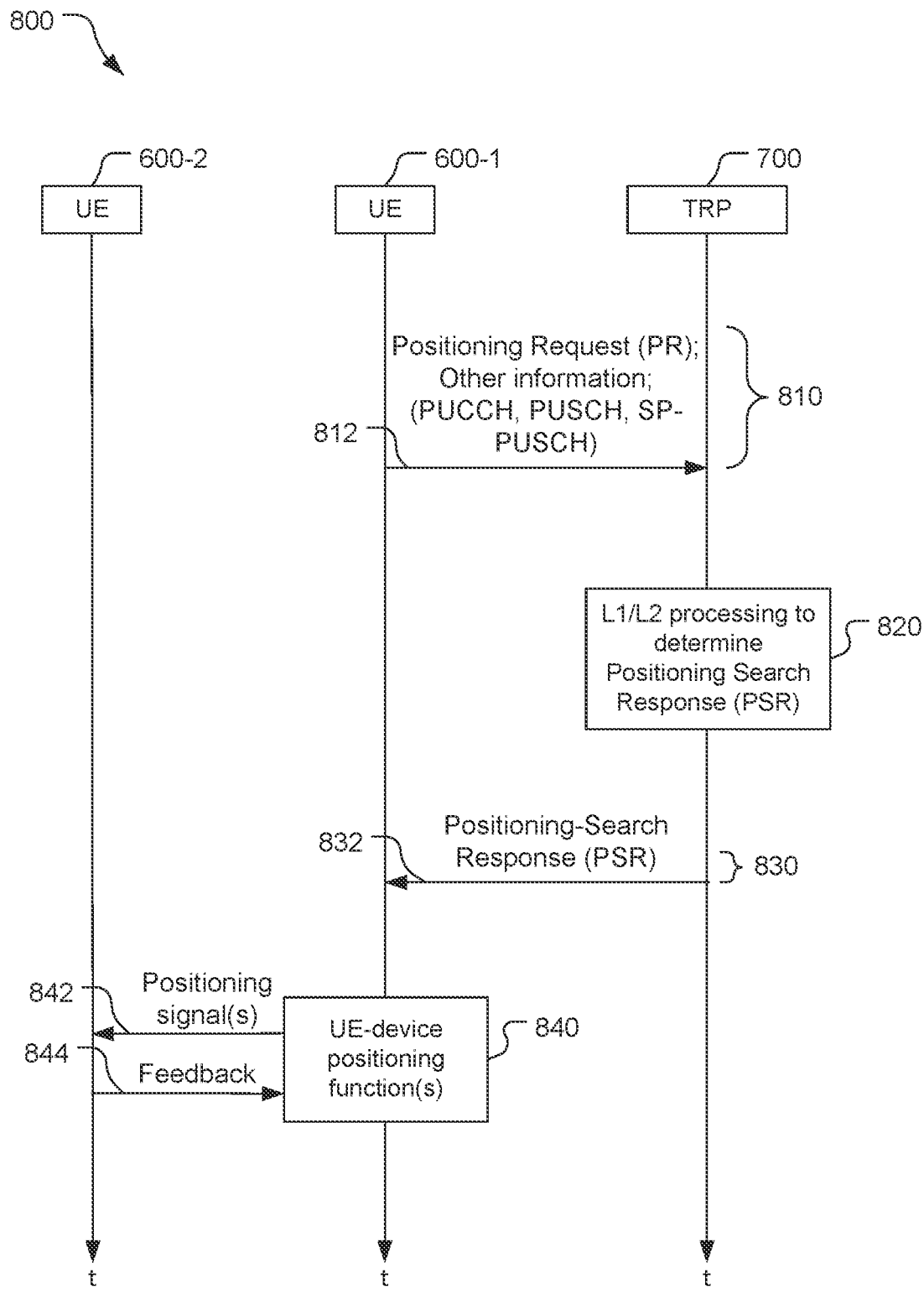
FIG. 8 is a signaling and process flow of physical layer communications for base-station-assisted user equipment positioning.

Referring also to FIG. 8, a signaling and process flow 800 of requesting and providing positioning assistance information for UE-device positioning using the physical layer includes the stages shown. The discussion herein may use UE-to-UE positioning as an example of UE-device positioning, but the discussion herein, including the claims, is applicable beyond UE-to-UE positioning. The flow 800 is an example only, and stages may be added, rearranged, and/or removed. In the flow 800, a UE 600-1, which may be configured in accordance with the UE 600 shown in FIG. 6, may seek to perform UE-device positioning with a UE 600-2, that may also be configured in accordance with the UE 600 shown in FIG. 6.

At stage 810, the UE 600-1 may send a positioning request (PR) message 812 to the TRP 700. The transmit positioning request unit 650 is configured to produce and send the PR to the TRP 700 via the interface 620. The unit 650 may send the PR message 812 using the physical layer of the UE 600 to the TRP 700 over a PUCCH channel such that the PR message 812 is carried in the PUCCH channel. The PR message 812 may request (explicitly or implicitly) one or more parameters for use in signal exchange of one or more positioning reference signals between the UE 600-1 and another device, such as the UE 600-2 (e.g., a handset, a tablet computer, a car, etc.), a base station (gNB), a relay, etc. The PR message 812 may request one or more parameters for a UE to use to exchange one or more PRS with another UE. The unit 650 may be configured to produce the PR message 812 as a single bit, and/or the unit 650 may be configured to produce the PR message 812 as a single bit and also provide other information, e.g., one or more indications of one or more positioning technique characteristics, in association with the PR message 812 (e.g., in the same communication and/or with an indication that the PR message 812 and the one or more indications are related). The unit 650 may be configured to produce and send the PR message 812 in accordance with the PUCCH format used for sending the Scheduling Request (SR), as discussed above, over the PUCCH. Also or alternatively, the unit 650 may be configured to produce and send the PR message 812 in accordance with a new PUCCH format. For example, presently the NR PUCCH format 0 (PF0) spans 1-2 symbols and typically carries 1-2 bits which may be HARQ-ACK (Hybrid Automatic Repeat Request-acknowledge) bit(s) or an SR bit, or both. The structure of PF0 may be DMRS (Demodulation Reference Signal) based or sequence based. For the DMRS-based structure, the DMRS may be embedded in a UL control channel during UCI (Uplink Control Information) transmission so that the TRP (e.g., gNB such as NR NodeB) can coherently demodulate HARQ-ACK at the receiver. For the sequence-based structure, in lieu of DMRS, a sequence-based structure is used where DMRS overhead can be eliminated because channel estimation is not required for non-coherent detection used in a sequence-based structure. A new format that carriers PR might follow the approach of sequence-based PF0 but use different types of sequences, or different initialization sequences, or different cyclic shifts, or new computer-generated sequences (CGS) compared to PF0 presently.

The transmit positioning request unit 650 may be configured to send the PR message 812 over a Semi-Persistent PUSCH channel (SP-PUSCH). The unit 650 may be configured to receive information from the TRP 700 to establish an SP-PUSCH. The unit 650 may be configured to respond to a desire (e.g., a need) for a PR message to be sent by the UE 600-1 by using the available SP-PUSCH resource to transmit the PR message 812. The TRP 700 may provide the UE 600-1 with an open opportunity, via the SP-PUSCH, to get positioning information, e.g., intermittently such as periodically (e.g., every 20 ms).

Also or alternatively, the transmit positioning request unit 650 may be configured to use both the PUCCH and an SP-PUSCH to transmit the PR message 812 and other information. The unit 650 may be configured to send the PR (e.g., as one bit) on a PUCCH, and respond to an SP-PUSCH being established (e.g., configured) in response to the PR message 812, by using the SP-PUSCH to send other information such as the positioning technique characteristic(s).

Also or alternatively, the transmit positioning request unit 650 may be configured to use a PUSCH to transmit other information in association with the PR message 812. The unit 650 may be configured to send the PR message 812 (e.g., as one bit) on a PUCCH, for example, and respond to a PUSCH grant being issued to establish (e.g., configure) a regular (not SP) PUSCH. The unit 650 may send the other information (e.g., positioning technique characteristic(s)) over the PUSCH channel.

The information associated with the PR message 812 may comprise one or more of a variety of types of information (and may be considered to be part of the PR message 812 itself). For example, the information associated with the PR message 812 may include one or more reference signal types that the UE 600-1 is configured (be this a static or dynamic configuration) to transmit for the purpose of positioning. As another example, the information associated with the PR message 812 may include which positioning method that the UE 600-1 is configured (e.g., has selected) to use for positioning. As another example, the information associated with the PR message 812 may include technology that the UE 600-1 is configured to use for UE-device positioning. Examples of such technologies include radar, Bluetooth® short-range wireless protocol technologies, WLAN (Wireless Local Area Network), NR, LTE, etc. As another example, the information associated with the PR message 812 may include whether one or more measurement gaps are requested (and possibly timing of the requested measurement gap(s)). As another example, the information associated with the PR message 812 may include a bandwidth, time window, and available resources of the UE 600-1 for performing positioning. As another example, the information associated with the PR message 812 may include a band and/or carrier that the UE 600-1 would use for positioning (e.g., wireless interaction with the UE 600-2 to determine position information (e.g., location(s), measurement(s), range(s) such as a range to the UE 600-2, a pseudorange to the UE 600-2, a location of the UE 600-2, measurement information of a positioning signal exchanged between the UEs 600-1, 600-2, etc.). As another example, the information associated with the PR may include information that the UE 600-1 has regarding the UE 600-2 such as a location, or velocity, or a trajectory, or UE information (e.g., UE ID), or a combination of two or more of these.

At stage 820, the TRP 700 performs L1/L2 processing of information received from the UE 600-1 and other information, as appropriate, to determine the PSR. For example, the determine and send PSR unit 750 of the TRP 700 may be configured to respond to the PR message 812 received from the UE 600-1 at stage 810 by processing appropriate information, e.g., the information provided by the UE 600-1 in association with (or as part of) the PR message 812. The unit 750 may process the information within the bottom two layers, L1, L2, of the 5G protocol stack of the TRP 700. The L1 layer is the physical layer and the L2 layer is the data link layer (also called the MAC (Media Access Control) layer, RLC (Radio Link Control) layer, or PDCP (Packet Data Convergence Protocol) layer). By avoiding using higher layers (above the MAC layer) of the protocol stack, the TRP 700 may limit latency of the processing and provide low-latency service for positioning to help meet target latencies (e.g., from request to positioning fix, or physical-layer latency) of less than 100 ms or even less than 10 ms (e.g., for Industrial Internet of Things (IIoT) applications). Using a higher layer (above the MAC layer) to determine and encode the PSR would involve more processing and more data (more bits constituting the PSR determined and encoded using higher-layer processing) than determining and encoding the PSR using the physical and/or the MAC layer directly, without involving a higher layer.

At stage 830, the TRP 700 sends the PSR, produced at stage 820, in a PSR message 832. The TRP 700 may be configured to send the PSR message 832 as a physical layer message including one or more types of a variety of positioning assistance information. The PSR message 832 has fewer bits than a similar message produced using one or more protocol layers above the MAC layer would have. The PSR message 832 may indicate one or more parameters for signal exchange of one or more positioning reference signals between the UE and another device. For example, the PSR message 832 may include an indication of physical layer resources that the UE 600-1 (which may be called a target UE) is authorized to use for the purpose of transmitting any requested reference signal, e.g., a positioning reference signal such as a PRS or an SRS (also called a UL-PRS). As another example, the PSR message 832 may include an indication of authorization for one or more operations by the UE 600-1, e.g., for the UE 600-1 to use an unlicensed band or to use a band of the TRP 700. As another example, the PSR message 832 may include an indication of physical resources that the UE 600-1 may use for the purpose of receiving one or more reference signals from one or more other UEs, e.g., the UE 600-2. This indication may be in a format of a start symbol, an end symbol, a start PRB, and an end PRB, or in a format of a regular PRS configuration or a regular SRS configuration. As another example, the PSR message 832 may include an indication of what type of signal the UE 600-1 is authorized to transmit, at what power level(s), and/or for how long (i.e., what duration(s)). As another example, the PSR message 832 may include an indication of one or more measurement gaps (i.e., times during which the UE 600-1 should not receive signals, e.g., PRS signals, from the TRP 700 that the UE 600-1 is expected to measure) configured to the UE 600-1 to aid transmission by the TRP 700, and/or reception and measurement by the UE 600-1, of the PSR message 832. For example, the TRP 700 may proactively schedule one or more measurement gaps in anticipation (e.g., based on location, velocity, and/or trajectory of the UE 600-1) of the UE 600-1 coming into an area of high UE density (e.g., an intersection with many vehicles, a parking lot, an exit of a parking lot (e.g., from a sports stadium or other event venue (e.g., a theater))). As another example, the PSR message 832 may include an indication of one or more measurement gaps configured to the UE 600-1 to aid reception and measurement by the UE 600-1 of one or more signals sent by one or more other UEs, e.g., the UE 600-2. As another example, the PSR message 832 may include information related to one or more other UEs that are neighbors to (e.g., within communication range of, and/or within a threshold distance of, etc.) the UE 600-1. Such information may include a list of the one or more other UEs, possibly together with UE IDs and/or location information for the other UE(s). The location information may be in a global coordinate system or relative to a coordinate system with respect to a reference location such as the location of the TRP 700 or a reported location of the target UE 600-1. As another example, the information related to one or more other UEs may include a velocity and/or a trajectory of each of one or more UEs. As another example, the information related to one or more other UEs may include UE IDs for identification/scrambling/descrambling purposes. Resources may be assigned, e.g., by the TRP 700, to the UEs 600 in the code domain to implement signal scrambling to help avoid signal collisions. Information, such as information regarding a particular UE, may be encoded (scrambled) using a UE ID of the particular UE and the UE ID may be used to descramble the scrambled information.

The PSR message 832 may be sent in a variety of formats and may be sent in multiple communications. For example, the unit 750 may be configured to send the PSR message 832 in accordance with a PDCCH format scrambled with an RNTI (Radio Network Temporary Identifier). For example, when a new RNTI is established, the associated UEs 600 may monitor signals scrambled with the new RNTI for the PSR information. The PDCCH communication may schedule a unicast PDSCH and a PDSCH communication over the PDSCH may contain information for the UE 600-1 to perform transmission of any appropriate reference signal(s) for positioning (e.g., UE-device positioning such as UE-to-UE positioning). For example, such information may be provided where the information does not fit in the PDCCH communication (e.g., the information exceeds 100 bits). The unit 750 may be configured to format the PDCCH communication with the new RNTI as a group-common PDCCH communication, with a separate block of data dedicated to each PR (i.e., for each different UE 600 sending a positioning request). For example, each block of the group-common PDCCH may contain information for granting a PDSCH that contains the PSR information. The group-common communication may have a common scrambling, and the UEs 600 will be able to determine which block within the group-common communication corresponds to each UE 600 (e.g., by knowing where in the group-common communication the block for each UE 600 is located and/or by having identifying information in each block, etc.).

At stage 840, the UE 600-1 may perform one or more positioning functions. For example, the perform UE-device positioning unit 660 may be configured to use some or all of the positioning assistance information provided in the PSR message 832 to interact with one or more other devices (e.g., one or more base stations, one or more relays, one or more UEs 600 such as the UE 600-2, etc.) to determine position information. For example, the UE 600-1 may send one or more positioning signals 842 such as a radar signal, a Positioning Reference Signal (PRS), a Sounding Reference Signal (SRS), etc. in accordance with the positioning assistance information, e.g., at a specified power level, for a specified duration, etc. The UE 600-1 may receive feedback 844 in response to the one or more positioning signals 842 and process the feedback 844. For example, the feedback 844 may comprise a reflected radar signal, or measurement information such as a received power of the positioning signal 842, or a time of arrival and/or angle of arrival of the positioning signal 842, a range between the UEs 600-1, 600-2, a location and/or velocity and/or trajectory of the UE 600-2, etc. The UE 600-1 may perform one or more operations on the feedback 844 for positioning, e.g., to determine a position of the UE 600-1, a velocity and/or trajectory of the UE 600-1, a closing rate between the UE 600-1 and the UE 600-2, a range to the UE 600-2 from the UE 600-1, etc.

Figure 9:
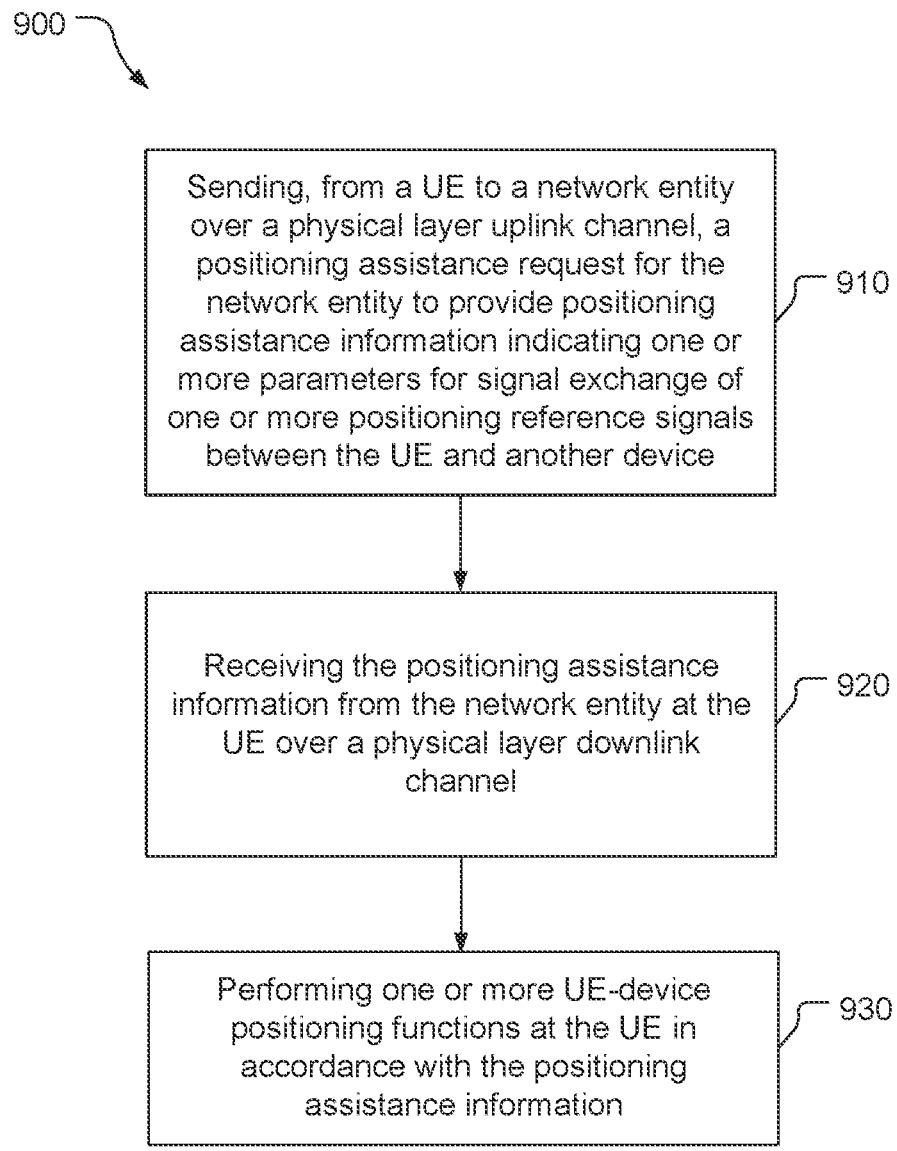
FIG. 9 is a block flow diagram of a method of requesting positioning assistance information using a physical layer of a user equipment.

Referring to FIG. 9, with further reference to FIGS. 1-8, a method 900 of requesting positioning assistance information using a physical layer of UE includes the stages shown. The method 900 is, however, an example only and not limiting. The method 900 may be altered, e.g., by having stages added, removed, rearranged, combined, performed concurrently, and/or having single stages split into multiple stages. For example, stage 930 may be omitted.

At stage 910, the method 900 may include sending, from the UE to a network entity over a physical layer uplink channel, a positioning assistance request for the network entity to provide positioning assistance information indicating one or more parameters for signal exchange of one or more positioning reference signals between the UE and another device. For example, the transmit positioning request unit 650 of the UE 600 (e.g., the UE 600-1 shown in FIG. 8) may send the PR message 812 to a serving base station such as the TRP 700 (or to the server 400 (e.g., an LMF) or another network entity) at stage 810. The positioning assistance request may consist of a single bit. The positioning assistance request may have a positioning-request format that is a format of a scheduling request for requesting an uplink grant for the UE to transmit over a physical uplink shared channel. The physical uplink shared channel may be a semi-persistent physical uplink shared channel. Means for sending, to a network entity over a physical layer uplink channel, a positioning assistance request for the network entity to provide positioning assistance information may comprise the processor 610, possibly in combination with the memory 630, and the interface 620 (e.g., the wireless transmitter 242).

At stage 920, the method 900 may include receiving the positioning assistance information from the network entity at the UE over a physical layer downlink channel. For example, the UE 600-1 may receive the PSR message 832 from the TRP 700 at stage 830. The positioning assistance information may provide instructions (e.g., limitations and/or authorizations) for how the UE 600-1 will operate to perform one or more positioning functions (e.g., sending a positioning reference signal, etc.). Means for receiving the positioning assistance information from the network entity over a physical layer downlink channel may comprise the processor 610, possibly in combination with the memory 630, and the interface 620 (e.g., the wireless receiver 244).

At stage 930, the method 900 may include performing one or more UE-device positioning functions at the UE in accordance with the positioning assistance information. For example, the UE 600-1 may perform one or more positioning functions as discussed above with respect to stage 840. This may include interacting with the UE 600-2, processing some or all of the feedback 844 received from the UE 600-2 to determine position information, etc. Means for performing one or more UE-device positioning functions in accordance with the positioning assistance information may comprise the processor 610, possibly in combination with the memory 630.

Implementations of the method 900 may include one or more of the following features. In an example implementation, the method 900 may include sending one or more indications of positioning technique characteristics to the base station over the physical-layer uplink channel in association with the positioning assistance request. Means for sending the indications of positioning technique characteristics may comprise the processor 610, possibly in combination with the memory 630, and the interface 620 (e.g., the wireless transmitter 242). The one or more indications of positioning technique characteristics may include: (i) one or more reference signal types to be transmitted by the UE; or (ii) a positioning technique that the UE is configured to use to determine position; or (iii) a signal technology that the UE is configured to use to determine position; or (iv) a measurement gap request; or (v) a bandwidth, time window, and resource request; or (vi) a band or carrier to be used by the UE for position determination; or (vii) a location, or velocity, or trajectory, or combination of two or more thereof, of a neighbor UE; or (viii) a combination of two or more of (i)-(vii). Examples of reference signal types include NR signals (such as SL PRS, PSSCH, DMRS, DL PRS) or signals of other (non-NR) technologies. In another example implementation, the method 900 may include sending the positioning assistance request over a semi-persistent physical uplink shared channel. As another example, the method 900 may include sending the positioning assistance request over a physical uplink control channel. The method 900 may include sending, from the UE to the base station of a physical uplink shared channel (which may be a semi-persistent PUSCH), one or more indications of positioning technique characteristics associated with the positioning assistance request. Means for sending the one or more indication of positioning technique characteristics may comprise the processor 610, possibly in combination with the memory 630, and the interface 620 (e.g., the wireless transmitter 242).

Also or alternatively, implementations of the method 900 may include one or more of the following features. In an example implementation, the method 900 may include determining which physical resources of the UE to use for performing the one or more UE-device positioning functions based on the positioning assistance information. For example, the UE 600-1 (e.g., the perform UE-device positioning unit 660) may use the positioning assistance information to determine which resources of the UE 600-1 to use to perform positioning. Determining which physical resources of the UE to use for performing the one or more UE-device positioning functions may include determining, based on the positioning assistance information, at least one of a type of a positioning signal to transmit for UE-device positioning, or a transmit power level for the positioning signal, or a positioning signal transmit duration, or a first measurement gap in which to transmit the positioning signal, or a second measurement gap for receiving an inbound positioning signal from another UE. Types of positioning signals include DL PRS, SRS, Sidelink PRS, LTE PRS, a new waveform signal, radar signal, Bluetooth® signal, GNSS, etc. Means for determining which physical resources of the UE to use for performing the one or more UE-device positioning functions may comprise the processor 610, possibly in combination with the memory 630. In another example implementation, the method 900 may include descrambling positioning signals using a UE identity in the positioning assistance information. Means for descrambling positioning signals may comprise the processor 610, possibly in combination with the memory 630 (and possibly the interface 620, e.g., the wireless receiver 244).

Figure 10:
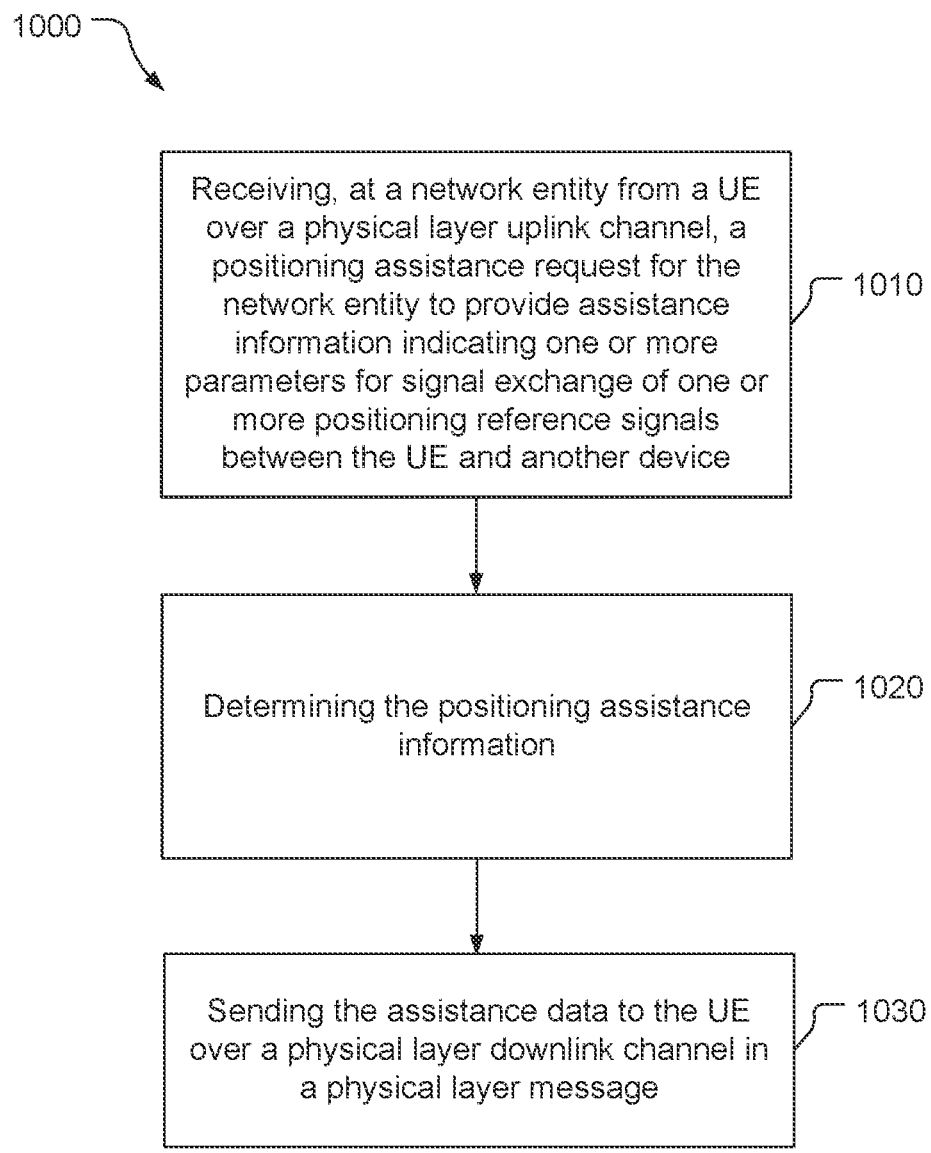
FIG. 10 is a block flow diagram of a method of providing positioning assistance information using a physical layer.

Referring to FIG. 10, with further reference to FIGS. 1-9, a method 1000 of providing positioning assistance information using a physical layer of a base station includes the stages shown. The method 1000 is, however, an example only and not limiting. The method 1000 may be altered, e.g., by having stages added, removed, rearranged, combined, performed concurrently, and/or having single stages split into multiple stages.

At stage 1010, the method 1000 may include receiving, at a network entity from a user equipment (UE) over a physical-layer uplink channel, a positioning assistance request for the network entity to provide positioning assistance information indicating one or more parameters for signal exchange of one or more positioning reference signals between the UE and another device. For example, the TRP 700 (or other network entity) may receive the PR message 812 at stage 810. Means for receiving, from a user equipment (UE) over a physical layer uplink channel, a positioning assistance request for the network entity to provide positioning assistance information may comprise the processor 710, possibly in combination with the memory 730, and the interface 720 (e.g., the wireless receiver 344).

At stage 1020, the method 1000 may include determining the positioning assistance information. For example, at stage 820, the determine and send positioning-search response unit 750 may determine the positioning assistance information within Layer 1 and/or Layer 2 of the 5G protocol stack (without using functionality of any higher layer of the 5G protocol stack). The TRP 700 may determine the positioning assistance information within the physical layer and the data link layer. Positioning assistance information determined and encoded within Layer 1 and/or Layer 2 only will consist of fewer bits than similar assistance information (containing the same content) determined and encoded using a higher layer (e.g., a physical layer transmission of the lower-layer-determined information will use fewer bits than a physical layer transmission of the higher-layer-determined information). The positioning assistance information may include a first indication of physical resources that the UE is allowed to use for transmitting a reference signal for UE-device positioning. The positioning assistance information may include at least one of a type of a positioning signal that the UE is authorized to transmit for UE-device positioning, or a transmit power level that the UE is authorized to use to transmit a signal for UE-device positioning, or a positioning signal transmit duration that the UE is authorized to use for UE-device positioning, or a measurement gap in which the UE is authorized to transmit the positioning signal. The positioning assistance information may include a first indication of physical resources that the UE is allowed to use for receiving a reference signal for UE-device positioning. The positioning assistance information may include a measurement gap to be used by the UE for receiving an inbound positioning signal from another UE. The UE may be a first UE and the positioning assistance information may include: (i) a UE identity of a second UE neighboring the first UE; or (ii) a location of the second UE; or (ii) a velocity of the second UE; or (iii) a trajectory of the second UE; or (iv) descrambling information for descrambling the positioning assistance information. The positioning assistance information may be determined within a bottom two layers of a 5G protocol stack. Means for determining the positioning assistance information may comprise the processor 710, possibly in combination with the memory 730.

At stage 1030, the method 1000 may include sending the positioning assistance information to the UE over a physical layer downlink channel in a physical layer message. For example, the TRP 700 (e.g., the unit 750) sends the positioning assistance information in the PSR message 832 at stage 830. Sending the positioning assistance information may include sending the physical layer message as a unicast message over a physical downlink shared channel. Sending the positioning assistance information may include sending the physical layer message as a group-common message over a physical downlink control channel. Means for sending the positioning assistance information to the UE over a physical layer downlink channel in a physical layer message may comprise the processor 710, possibly in combination with the memory 730, and the interface 720 (e.g., the wireless transmitter 342).

Implementations of the method 1000 may include one or more of the following features. In an example implementation, the method 1000 may include responding to receiving a plurality of positioning assistance requests from a plurality of requesting UEs by producing the physical layer message with a plurality of blocks each comprising grant information for granting a respective physical downlink shared channel to each of the plurality of requesting UEs. For example, the unit 750 may produce a group-common message with blocks of information, each block corresponding to a respective UE 600 from which the TRP 700 received a PR message 812. Means for responding to receiving a plurality of positioning assistance requests from a plurality of requesting UEs by producing the physical layer message with the plurality of blocks may comprise the processor 710, possibly in combination with the memory 730.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
a transceiver configured to send and receive communications signals wirelessly to and from a network entity;
a memory; and
a processor, communicatively coupled to the transceiver and the memory, configured to:
send, via the transceiver to the network entity over a physical layer uplink channel, a positioning assistance request for the network entity to provide positioning assistance information indicating one or more parameters for signal transfer of one or more positioning reference signals between the UE and another device, wherein the processor is configured to send at least a portion of the positioning assistance request using a physical uplink shared channel;
receive the positioning assistance information from the network entity via the transceiver over a physical layer downlink channel; and
perform one or more UE-device positioning functions in accordance with the positioning assistance information.

2. The UE of claim 1, wherein the portion of the positioning assistance request is a second portion, the positioning assistance request further includes a first portion, the processor is configured to send the first portion of the positioning assistance request using a physical uplink control channel, and the first portion of the positioning assistance request consists of a single bit.

3. The UE of claim 1, wherein the positioning assistance request has a format of a scheduling request for requesting an uplink grant for the UE to transmit over a physical uplink shared channel.

4. The UE of claim 1, wherein the processor is further configured to send, via the transceiver to the network entity over the physical layer uplink channel, one or more indications of positioning technique characteristics.

5. The UE of claim 4, wherein the one or more indications of positioning technique characteristics includes:
(i) one or more reference signal types to be transmitted by the UE; or
(ii) a positioning technique that the UE is configured to use to determine position; or
(iii) a signal technology that the UE is configured to use to determine position; or
(iv) a measurement gap request; or
(v) a bandwidth, time window, and resource request; or
(vi) a band or carrier to be used by the UE for position determination; or
(vii) a location, or velocity, or trajectory, or combination of two or more thereof, of a neighbor UE; or
(viii) a combination of two or more of (i)-(vii).

6. The UE of claim 1, wherein the processor is configured to send at least the portion of the positioning assistance request over a semi-persistent physical uplink shared channel.

7. The UE of claim 1, wherein the portion of the positioning assistance request is a second portion, and the positioning assistance request further includes a first portion, and wherein the processor is configured to send the first portion of the positioning assistance request over a physical uplink control channel.

8. The UE of claim 7, wherein the processor is further configured to send, via the transceiver to the network entity over the physical uplink shared channel, one or more indications of positioning technique characteristics.

9. The UE of claim 8, wherein the physical uplink shared channel is a semi-persistent physical uplink shared channel.

10. The UE of claim 1, wherein the processor is configured to determine which physical resources of the UE to use for performing the one or more UE-device positioning functions based on the positioning assistance information.

11. The UE of claim 10, wherein the processor is configured to determine, based on the positioning assistance information, at least one of a type of a positioning signal to transmit for UE-device positioning, or a transmit power level for the positioning signal, or a positioning signal transmit duration, or a first measurement gap in which to transmit the positioning signal, or a second measurement gap for receiving an inbound positioning signal from another UE.

12. The UE of claim 10, wherein the processor is configured to descramble positioning signals using a UE identity in the positioning assistance information.

13. A user equipment (UE) comprising:
  means for sending, to a network entity over a physical layer uplink channel, a positioning assistance request for the network entity to provide positioning assistance information indicating one or more parameters for signal transfer of one or more positioning reference signals between the UE and another device, wherein the means for sending comprises means for sending at least a portion of the positioning assistance request using a physical uplink shared channel;
  means for receiving the positioning assistance information from the network entity over a physical layer downlink channel; and
  means for performing one or more UE-device positioning functions in accordance with the positioning assistance information.

14. The UE of claim 13, wherein the portion of the positioning assistance request is a second portion, the positioning assistance request further includes a first portion, the means for sending the positioning assistance request is for sending the first portion of the positioning assistance request using a physical uplink control channel, and the first portion of the positioning assistance request consists of a single bit.

15. The UE of claim 13, wherein the positioning assistance request has a format of a scheduling request for requesting an uplink grant for the UE to transmit over a physical uplink shared channel.

16. The UE of claim 13, wherein the means for sending the positioning assistance request are for sending one or more indications of positioning technique characteristics to the network entity over the physical layer uplink channel in association with the positioning assistance request, and wherein the one or more indications of positioning technique characteristics includes:
  (i) one or more reference signal types to be transmitted by the UE; or
  (ii) a positioning technique that the UE is configured to use to determine position; or
  (iii) a signal technology that the UE is configured to use to determine position; or
  (iv) a measurement gap request; or
  (v) a bandwidth, time window, and resource request; or
  (vi) a band or carrier to be used by the UE for position determination; or
  (vii) a location, or velocity, or trajectory, or combination of two or more thereof, of a neighbor UE; or
  (viii) a combination of two or more of (i)-(vii).

17. The UE of claim 13, wherein the portion of the positioning assistance request is a second portion, and the positioning assistance request further includes a first portion, and wherein the means for sending the positioning assistance request are comprises means for sending the first portion of the positioning assistance request over a physical uplink control channel.

18. The UE of claim 17, further comprising means for sending, to the network entity over the physical uplink shared channel, one or more indications of positioning technique characteristics associated with the positioning assistance request.

19. The UE of claim 13, further comprising determining means for determining which physical resources of the UE to use for performing the one or more UE-device positioning functions based on at least one of a type of a positioning signal to transmit for UE-device positioning, or a transmit power level for the positioning signal, or a positioning signal transmit duration, or a first measurement gap in which to transmit the positioning signal, or a second measurement gap for receiving an inbound positioning signal from another UE.

20. A positioning method of a user equipment (UE), the method comprising:
  sending, from the UE to a network entity over a physical layer uplink channel, a positioning assistance request for the network entity to provide positioning assistance information indicating one or more parameters for signal transfer of one or more positioning reference signals between the UE and another device, including sending at least a portion of the positioning assistance request using a physical uplink shared channel;
  receiving the positioning assistance information from the network entity at the UE over a physical layer downlink channel; and
  performing one or more UE-device positioning functions at the UE in accordance with the positioning assistance information.

21. The method of claim 20, wherein the portion of the positioning assistance request is a second portion, the positioning assistance request further includes a first portion, sending the positioning assistance request includes sending the first portion of the positioning assistance request using a physical uplink control channel, and the first portion of the positioning assistance request consists of a single bit.

22. The method of claim 20, wherein the positioning assistance request has a format of a scheduling request for requesting an uplink grant for the UE to transmit over a physical uplink shared channel.

23. The method of claim 20, further comprising sending one or more indications of positioning technique characteristics to the network entity over the physical layer uplink channel in association with the positioning assistance request, and wherein the one or more indications of positioning technique characteristics includes:
  (i) one or more reference signal types to be transmitted by the UE; or
  (ii) a positioning technique that the UE is configured to use to determine position; or
  (iii) a signal technology that the UE is configured to use to determine position; or
  (iv) a measurement gap request; or
  (v) a bandwidth, time window, and resource request; or
  (vi) a band or carrier to be used by the UE for position determination; or
  (vii) a location, or velocity, or trajectory, or combination of two or more thereof, of a neighbor UE; or
  (viii) a combination of two or more of (i)-(vii).

24. The method of claim 20, wherein the portion of the positioning assistance request is a second portion, and the positioning assistance request further includes a first portion, and wherein sending the positioning assistance request comprises sending the first portion of the positioning assistance request over a physical uplink control channel.

25. The method of claim 24, further comprising sending, from the UE to the network entity over the physical uplink shared channel, one or more indications of positioning technique characteristics associated with the positioning assistance request.

26. The method of claim 25, wherein the physical uplink shared channel is a semi-persistent physical uplink shared channel.

27. The method of claim 20, further comprising determining which physical resources of the UE to use for performing the one or more UE-device positioning functions based on the positioning assistance information.

28. The method of claim 27, wherein determining which physical resources of the UE to use for performing the one or more UE-device positioning functions comprises determining, based on the positioning assistance information, at least one of a type of a positioning signal to transmit for UE-device positioning, or a transmit power level for the positioning signal, or a positioning signal transmit duration, or a first measurement gap in which to transmit the positioning signal, or a second measurement gap for receiving an inbound positioning signal from another UE.

29. The method of claim 27, further comprising descrambling positioning signals using a UE identity in the positioning assistance information.

30. A non-transitory, processor-readable storage medium comprising processor-readable instructions configured to cause a processor of a user equipment (UE) to:

send, to a network entity over a physical layer uplink channel, a positioning assistance request for the network entity to provide positioning assistance information indicating one or more parameters for signal transfer of one or more positioning reference signals between the UE and another device, wherein the processor-readable instructions configured to cause the processor to send the positioning assistance request comprise processor-readable instructions configured to cause the processor to send at least a portion of the positioning assistance request using a physical uplink shared channel;

receive the positioning assistance information from the network entity over a physical layer downlink channel; and perform one or more UE-device positioning functions in accordance with the positioning assistance information.

* * * * *